(12) United States Patent
Raghothaman

(10) Patent No.: US 10,798,667 B2
(45) Date of Patent: Oct. 6, 2020

(54) AUTOMATIC TRANSMIT POWER CONTROL FOR RADIO POINTS OF A CENTRALIZED RADIO ACCESS NETWORK THAT PRIMARILY PROVIDE WIRELESS SERVICE TO USERS LOCATED IN AN EVENT AREA OF A VENUE

(71) Applicant: CommScope Technologies LLC, Hickory, NC (US)

(72) Inventor: Balaji B Raghothaman, Chester Springs, PA (US)

(73) Assignee: CommScope Technologies LLC, Hickory, NC (US)

( * ) Notice: Subject to any disclaimer, the term of this patent is extended or adjusted under 35 U.S.C. 154(b) by 0 days.

(21) Appl. No.: 16/432,314

(22) Filed: Jun. 5, 2019

(65) Prior Publication Data

US 2019/0380097 A1 Dec. 12, 2019

Related U.S. Application Data

(60) Provisional application No. 62/682,472, filed on Jun. 8, 2018.

(51) Int. Cl.
| | |
|---|---|
| *H04W 52/32* | (2009.01) |
| *H04W 52/38* | (2009.01) |
| *H04W 52/34* | (2009.01) |
| *H04W 74/08* | (2009.01) |
| *H04W 52/28* | (2009.01) |

(52) U.S. Cl.
CPC ....... *H04W 52/386* (2013.01); *H04W 52/283* (2013.01); *H04W 52/32* (2013.01); *H04W 52/34* (2013.01); *H04W 74/0833* (2013.01)

(58) Field of Classification Search
CPC . H04W 52/386; H04W 52/283; H04W 52/32; H04W 52/34; H04W 74/0833
USPC ................................... 455/522, 69
See application file for complete search history.

(56) References Cited

U.S. PATENT DOCUMENTS

| | | |
|---|---|---|
| 6,711,144 B1 | 3/2004 | Kim et al. |
| 6,731,618 B1 | 5/2004 | Chung et al. |
| 6,741,862 B2 | 5/2004 | Chung et al. |

(Continued)

FOREIGN PATENT DOCUMENTS

| | | |
|---|---|---|
| CN | 1719929 A | 1/2006 |
| CN | 101534507 A | 9/2009 |

(Continued)

OTHER PUBLICATIONS

"3rd Generation Partnership Project; Technical Specification Group Radio Access Network; Evolved Universal Terrestrial Radio Access (E-UTRA); Requirements for support of radio resource management", 3GPP, Mar. 2008, pp. 1-25, 3GPP Organizational Partners.

(Continued)

*Primary Examiner* — Hai V Nguyen
(74) *Attorney, Agent, or Firm* — Fogg & Powers LLC (57) ABSTRACT

Some embodiments are directed to systems and methods for performing automatic transmit power control for a subset of radio points of a centralized radio access network (C-RAN) deployed in a venue (such as a stadium or arena) that are mounted in or near the venue so as to primarily provide wireless coverage to user equipment located in the event area of the venue.

22 Claims, 3 Drawing Sheets

(56) References Cited

U.S. PATENT DOCUMENTS

| | | | |
|---|---|---|---|
| 6,781,999 B2 | 8/2004 | Eyuboglu et al. | |
| 6,985,451 B1 | 1/2006 | Nattiv et al. | |
| 7,170,871 B2 | 1/2007 | Eyuboglu et al. | |
| 7,200,391 B2 | 4/2007 | Chung et al. | |
| 7,242,958 B2 | 7/2007 | Chung et al. | |
| 7,277,446 B1 | 10/2007 | Abi-Nassif et al. | |
| 7,299,278 B2 | 11/2007 | Ch'ng | |
| 7,415,242 B1 | 8/2008 | Ngan | |
| 7,515,643 B2 | 4/2009 | Chung | |
| 7,558,356 B2 | 7/2009 | Pollman et al. | |
| 7,558,588 B2 | 7/2009 | To et al. | |
| 7,603,127 B2 | 10/2009 | Chung et al. | |
| 7,626,926 B2 | 12/2009 | Abi-Nassif et al. | |
| 7,672,682 B2 | 3/2010 | Sharma et al. | |
| 7,715,466 B1 | 5/2010 | Oh et al. | |
| 7,729,243 B2 | 6/2010 | Ananthaiyer et al. | |
| 7,730,189 B2 | 6/2010 | Harikumar et al. | |
| 7,751,835 B2 | 7/2010 | Sharma et al. | |
| 7,801,487 B2 | 9/2010 | Mehrabanzad et al. | |
| 7,831,257 B2 | 11/2010 | Pollman et al. | |
| 7,835,698 B2 | 11/2010 | Eyuboglu et al. | |
| 7,843,892 B2 | 11/2010 | Mehrabanzad et al. | |
| 7,860,513 B2 | 12/2010 | Chung et al. | |
| 7,907,571 B2 | 3/2011 | Raghothaman et al. | |
| 7,920,541 B2 | 4/2011 | To et al. | |
| 7,926,098 B2 | 4/2011 | Chinitz et al. | |
| 7,933,619 B2 | 4/2011 | Kim | |
| 7,934,001 B2 | 4/2011 | Harikumar et al. | |
| 7,953,040 B2 | 5/2011 | Harikumar et al. | |
| 7,983,672 B2 | 7/2011 | Humblet et al. | |
| 7,983,708 B2 | 7/2011 | Mehrabanzad et al. | |
| 7,995,493 B2 | 8/2011 | Anderlind et al. | |
| 8,023,439 B2 | 9/2011 | Rao | |
| 8,060,058 B2 | 11/2011 | Ch'ng et al. | |
| 8,078,165 B2 | 12/2011 | Mate et al. | |
| 8,085,696 B2 | 12/2011 | Garg et al. | |
| 8,094,630 B2 | 1/2012 | Garg et al. | |
| 8,099,504 B2 | 1/2012 | Cherian et al. | |
| 8,111,253 B2 | 2/2012 | Rao | |
| 8,130,686 B2 | 3/2012 | Rao et al. | |
| 8,140,091 B2 | 3/2012 | Chung et al. | |
| 8,145,221 B2 | 3/2012 | Garg et al. | |
| 8,160,020 B2 | 4/2012 | Eyuboglu et al. | |
| 8,160,629 B2 | 4/2012 | Mate et al. | |
| 8,160,631 B2 | 4/2012 | Raghothaman et al. | |
| 8,160,829 B2 | 4/2012 | Kalenine | |
| 8,165,528 B2 | 4/2012 | Raghothaman et al. | |
| 8,170,598 B2 | 5/2012 | Raghothaman et al. | |
| 8,176,327 B2 | 5/2012 | Kiong et al. | |
| 8,194,597 B2 | 6/2012 | Feder et al. | |
| 8,195,187 B2 | 6/2012 | Eyuboglu et al. | |
| 8,229,397 B2 | 7/2012 | Hou et al. | |
| 8,229,498 B2 | 7/2012 | Ch'ng et al. | |
| 8,254,848 B1* | 8/2012 | Elliott | H04B 7/022 370/242 |
| 8,259,671 B2 | 9/2012 | Raghothaman et al. | |
| 8,280,376 B2 | 10/2012 | Rajagopalan et al. | |
| 8,290,527 B2 | 10/2012 | Richardson | |
| 8,295,256 B2 | 10/2012 | Humblet et al. | |
| 8,295,818 B2 | 10/2012 | Palnati et al. | |
| 8,311,570 B2 | 11/2012 | Richardson | |
| 8,326,342 B2 | 12/2012 | Raghothaman et al. | |
| 8,340,636 B2 | 12/2012 | Yin et al. | |
| 8,345,694 B2 | 1/2013 | Den et al. | |
| 8,346,220 B2 | 1/2013 | Mate et al. | |
| 8,355,727 B2 | 1/2013 | Hoang et al. | |
| 8,358,623 B2 | 1/2013 | Samar et al. | |
| 8,379,566 B2 | 2/2013 | Gao et al. | |
| 8,379,625 B2 | 2/2013 | Humblet | |
| 8,385,291 B2 | 2/2013 | Richardson et al. | |
| 8,385,909 B1* | 2/2013 | Bhan | H04W 24/04 455/418 |
| 8,400,989 B2 | 3/2013 | Ch'ng et al. | |
| 8,402,143 B2 | 3/2013 | Ramaswamy et al. | |
| 8,428,601 B2 | 4/2013 | Samar et al. | |
| 8,452,299 B2 | 5/2013 | Raghothaman | |
| 8,457,084 B2 | 6/2013 | Valmikam et al. | |
| 8,503,342 B2 | 8/2013 | Richardson | |
| 8,520,659 B2 | 8/2013 | Humblet | |
| 8,521,223 B2* | 8/2013 | Bajj | H04W 84/045 455/553.1 |
| 8,532,580 B2* | 9/2013 | Elliott | H04B 7/022 370/242 |
| 8,532,658 B2 | 9/2013 | Knisely | |
| 8,542,707 B2 | 9/2013 | Hou et al. | |
| 8,543,139 B2 | 9/2013 | Samar et al. | |
| 8,554,231 B2 | 10/2013 | Jones | |
| 8,594,663 B2 | 11/2013 | Ch'ng et al. | |
| 8,599,711 B2 | 12/2013 | Hugl et al. | |
| 8,615,238 B2 | 12/2013 | Eyuboglu et al. | |
| 8,615,593 B2 | 12/2013 | Ch'ng et al. | |
| 8,619,702 B2 | 12/2013 | Garg et al. | |
| 8,639,247 B2 | 1/2014 | Ng et al. | |
| 8,688,809 B2 | 4/2014 | Ch'ng et al. | |
| 8,693,987 B2 | 4/2014 | Chiussi et al. | |
| 8,705,483 B2 | 4/2014 | Liu | |
| 8,718,697 B2 | 5/2014 | Srinivas et al. | |
| 8,731,574 B2 | 5/2014 | Ch'ng et al. | |
| 8,750,271 B2 | 6/2014 | Jones | |
| 8,768,337 B2* | 7/2014 | Fuller | H04W 52/265 455/422.1 |
| 8,768,338 B2* | 7/2014 | Fuller | H04W 52/265 455/422.1 |
| 8,774,134 B2 | 7/2014 | Raghothaman et al. | |
| 8,781,483 B2 | 7/2014 | Ch'ng | |
| 8,805,371 B2 | 8/2014 | Richardson et al. | |
| 8,831,592 B2* | 9/2014 | Elliot | H04B 7/022 370/252 |
| 8,831,679 B2* | 9/2014 | Bajj | H04W 84/045 455/553.1 |
| 8,843,638 B2 | 9/2014 | Garg et al. | |
| 8,867,451 B2* | 10/2014 | Kummetz | H04W 24/02 370/328 |
| 8,873,512 B2 | 10/2014 | Richardson et al. | |
| 8,886,249 B2 | 11/2014 | Richardson | |
| 8,909,278 B2 | 12/2014 | Rao et al. | |
| 8,914,041 B2* | 12/2014 | Bao | H04W 4/024 455/456.3 |
| 8,942,136 B2 | 1/2015 | Humblet | |
| 8,953,566 B2 | 2/2015 | Hegde et al. | |
| 8,958,809 B2 | 2/2015 | Name et al. | |
| 8,982,841 B2 | 3/2015 | Srinivasan | |
| 9,078,284 B2 | 7/2015 | Richardson | |
| 9,202,335 B2* | 12/2015 | Allen | G07F 17/3241 |
| 9,262,752 B2* | 2/2016 | Liu | G06Q 50/01 |
| 9,288,275 B2* | 3/2016 | Jain | H04L 67/22 |
| 9,351,182 B2* | 5/2016 | Elliott | H04W 76/15 |
| 9,380,466 B2 | 6/2016 | Eyuboglu et al. | |
| 9,414,399 B2* | 8/2016 | Eyuboglu | H04L 5/0023 |
| 9,467,876 B2* | 10/2016 | Kummetz | H04W 24/02 |
| 9,622,170 B2* | 4/2017 | Zhu | H04W 52/0206 |
| 9,668,151 B2* | 5/2017 | Elliott | H04W 4/025 |
| 9,730,085 B2* | 8/2017 | Elliott | G06F 16/245 |
| 9,780,841 B2* | 10/2017 | Berlin | H04B 10/25753 |
| 9,877,340 B1 | 1/2018 | Park et al. | |
| 9,900,114 B2* | 2/2018 | Fourie | H04B 17/16 |
| 9,936,470 B2 | 4/2018 | Eyuboglu et al. | |
| 10,008,100 B2* | 6/2018 | Gitau | G08B 25/009 |
| 10,039,015 B2* | 7/2018 | Elliott | H04W 36/0083 |
| 10,057,916 B2 | 8/2018 | Barabell et al. | |
| 10,064,072 B2 | 8/2018 | Eyuboglu et al. | |
| 10,082,569 B1* | 9/2018 | Adamo | G01S 13/758 |
| 10,111,116 B2* | 10/2018 | Kummetz | H04W 24/02 |
| 10,142,858 B2 | 11/2018 | Eyuboglu et al. | |
| 10,178,352 B2* | 1/2019 | Goldfeder | H04N 21/21805 |
| 10,225,024 B2* | 3/2019 | Antkowiak | H04B 17/17 |
| 10,277,709 B2* | 4/2019 | Meredith | G06F 16/9566 |
| 10,292,175 B2 | 5/2019 | Eyuboglu et al. | |
| 10,348,420 B2* | 7/2019 | Antkowiak | H04B 17/17 |
| 10,368,318 B2* | 7/2019 | Lo | H04W 52/262 |
| 10,455,597 B2* | 10/2019 | Eyuboglu | H04J 11/00 |
| 10,477,416 B2* | 11/2019 | Bhorkar | G06Q 50/01 |
| 10,477,576 B2* | 11/2019 | Lou | H04W 72/121 |

(56) References Cited

U.S. PATENT DOCUMENTS

| | | | |
|---|---|---|---|
| 10,484,883 B2* | 11/2019 | Zarifi | H04B 7/15507 |
| 2002/0018450 A1* | 2/2002 | McKenna | H04W 40/02 |
| | | | 370/328 |
| 2002/0037727 A1* | 3/2002 | McKenna | H04W 72/005 |
| | | | 455/452.2 |
| 2002/0128009 A1 | 9/2002 | Boch et al. | |
| 2002/0154055 A1 | 10/2002 | Davis et al. | |
| 2002/0194605 A1 | 12/2002 | Cohen et al. | |
| 2003/0147348 A1 | 8/2003 | Jiang | |
| 2004/0136373 A1 | 7/2004 | Bareis | |
| 2004/0143442 A1 | 7/2004 | Knight | |
| 2004/0146072 A1 | 7/2004 | Farmwald | |
| 2004/0224637 A1 | 11/2004 | Silva et al. | |
| 2005/0025160 A1 | 2/2005 | Meier et al. | |
| 2005/0073964 A1 | 4/2005 | Schmidt et al. | |
| 2005/0073987 A1 | 4/2005 | Wu | |
| 2005/0157675 A1 | 7/2005 | Feder et al. | |
| 2006/0056459 A1 | 3/2006 | Stratton et al. | |
| 2006/0056559 A1 | 3/2006 | Pleasant et al. | |
| 2006/0209752 A1 | 9/2006 | Wijngaarden et al. | |
| 2007/0023419 A1 | 2/2007 | Ptasienski et al. | |
| 2007/0058683 A1 | 3/2007 | Futami et al. | |
| 2007/0086487 A1 | 4/2007 | Yasuda et al. | |
| 2007/0140218 A1 | 6/2007 | Nair et al. | |
| 2007/0207838 A1 | 9/2007 | Kuwahara et al. | |
| 2007/0220573 A1 | 9/2007 | Chiussi et al. | |
| 2007/0230419 A1 | 10/2007 | Raman et al. | |
| 2007/0242648 A1 | 10/2007 | Garg et al. | |
| 2008/0003988 A1 | 1/2008 | Richardson | |
| 2008/0022180 A1 | 1/2008 | Kuo | |
| 2008/0137606 A1 | 6/2008 | Zuniga et al. | |
| 2008/0200202 A1 | 8/2008 | Montojo et al. | |
| 2008/0233886 A1 | 9/2008 | Kaminski et al. | |
| 2008/0240034 A1 | 10/2008 | Gollamudi | |
| 2009/0097444 A1 | 4/2009 | Lohr et al. | |
| 2009/0135718 A1 | 5/2009 | Yeo et al. | |
| 2009/0149189 A1 | 6/2009 | Sammour et al. | |
| 2009/0149221 A1 | 6/2009 | Liu et al. | |
| 2009/0180423 A1 | 7/2009 | Kroener | |
| 2009/0180435 A1 | 7/2009 | Sarkar | |
| 2009/0197551 A1* | 8/2009 | Paraskake | H04B 1/086 |
| | | | 455/179.1 |
| 2009/0265599 A1 | 10/2009 | Chae et al. | |
| 2009/0276542 A1 | 11/2009 | Aweya et al. | |
| 2009/0287976 A1 | 11/2009 | Wang et al. | |
| 2009/0300453 A1 | 12/2009 | Sahara | |
| 2009/0307554 A1 | 12/2009 | Marinier et al. | |
| 2009/0310534 A1 | 12/2009 | Lindskog et al. | |
| 2009/0316626 A1 | 12/2009 | Lee et al. | |
| 2009/0327829 A1 | 12/2009 | Yang et al. | |
| 2010/0011269 A1 | 1/2010 | Budianu et al. | |
| 2010/0011271 A1 | 1/2010 | Giancola et al. | |
| 2010/0034135 A1 | 2/2010 | Kim et al. | |
| 2010/0037115 A1 | 2/2010 | Zheng | |
| 2010/0062768 A1 | 3/2010 | Lindqvist et al. | |
| 2010/0069112 A1 | 3/2010 | Sun et al. | |
| 2010/0080163 A1* | 4/2010 | Krishnamoorthi | |
| | | | H04N 21/2385 |
| | | | 370/312 |
| 2010/0098010 A1 | 4/2010 | Kuo | |
| 2010/0115367 A1 | 5/2010 | Hsu | |
| 2010/0118777 A1 | 5/2010 | Yamada et al. | |
| 2010/0142494 A1 | 6/2010 | Hsu | |
| 2010/0167718 A1 | 7/2010 | Chiussi et al. | |
| 2010/0169732 A1 | 7/2010 | Wu | |
| 2010/0178875 A1 | 7/2010 | Oh et al. | |
| 2010/0185911 A1 | 7/2010 | Cheng | |
| 2010/0234035 A1 | 9/2010 | Fujishima et al. | |
| 2010/0246513 A1 | 9/2010 | Lindskog et al. | |
| 2010/0257419 A1 | 10/2010 | Sung et al. | |
| 2010/0291931 A1* | 11/2010 | Suemitsu | H04W 36/245 |
| | | | 455/436 |
| 2011/0081930 A1 | 4/2011 | Shimonabe et al. | |
| 2011/0134862 A1 | 6/2011 | Huang et al. | |
| 2011/0145672 A1 | 6/2011 | Jongren et al. | |
| 2011/0170517 A1 | 7/2011 | Bakker et al. | |
| 2011/0182255 A1 | 7/2011 | Kim et al. | |
| 2011/0194548 A1 | 8/2011 | Feder et al. | |
| 2011/0194630 A1 | 8/2011 | Yang et al. | |
| 2011/0211447 A1 | 9/2011 | Wang et al. | |
| 2011/0268007 A1 | 11/2011 | Barany et al. | |
| 2011/0287791 A1 | 11/2011 | Fujishima et al. | |
| 2011/0310802 A1 | 12/2011 | Song et al. | |
| 2012/0057572 A1 | 3/2012 | Evans et al. | |
| 2012/0127947 A1 | 5/2012 | Usui | |
| 2012/0140660 A1 | 6/2012 | Kang et al. | |
| 2012/0147815 A1 | 6/2012 | Meyer et al. | |
| 2012/0170514 A1* | 7/2012 | Lo | H04W 52/262 |
| | | | 370/328 |
| 2012/0176884 A1 | 7/2012 | Zhang | |
| 2012/0176966 A1 | 7/2012 | Ling | |
| 2012/0176980 A1 | 7/2012 | Moon et al. | |
| 2012/0176996 A1 | 7/2012 | Kim et al. | |
| 2012/0177153 A1 | 7/2012 | Cheng et al. | |
| 2012/0188929 A1 | 7/2012 | Zhang et al. | |
| 2012/0189074 A1 | 7/2012 | Jin et al. | |
| 2012/0195284 A1 | 8/2012 | Mann et al. | |
| 2012/0207105 A1 | 8/2012 | Geirhofer et al. | |
| 2012/0208581 A1 | 8/2012 | Ishida et al. | |
| 2012/0213109 A1 | 8/2012 | Xu et al. | |
| 2012/0250520 A1 | 10/2012 | Chen et al. | |
| 2012/0250740 A1 | 10/2012 | Ling | |
| 2012/0257570 A1 | 10/2012 | Jang et al. | |
| 2012/0264470 A1* | 10/2012 | Bajj | H04W 88/08 |
| | | | 455/509 |
| 2012/0300635 A1 | 11/2012 | Jersenius et al. | |
| 2012/0300766 A1 | 11/2012 | Chen et al. | |
| 2013/0016686 A1 | 1/2013 | Li et al. | |
| 2013/0029673 A1* | 1/2013 | Graves | H04W 24/02 |
| | | | 455/446 |
| 2013/0029711 A1 | 1/2013 | Kang et al. | |
| 2013/0034197 A1 | 2/2013 | Aweya et al. | |
| 2013/0100948 A1 | 4/2013 | Irvine | |
| 2013/0136053 A1 | 5/2013 | Kim et al. | |
| 2013/0136104 A1 | 5/2013 | Samar et al. | |
| 2013/0150065 A1* | 6/2013 | Elliott | H04W 24/06 |
| | | | 455/452.1 |
| 2013/0194985 A1 | 8/2013 | Zetterman et al. | |
| 2013/0203036 A1* | 8/2013 | Jabara | G06Q 30/0207 |
| | | | 434/350 |
| 2013/0223307 A1 | 8/2013 | Ohlsson et al. | |
| 2013/0223365 A1 | 8/2013 | Choi et al. | |
| 2013/0223391 A1 | 8/2013 | Koo et al. | |
| 2013/0242837 A1 | 9/2013 | Yang et al. | |
| 2013/0242919 A1 | 9/2013 | Koo et al. | |
| 2013/0250869 A1 | 9/2013 | Eriksson | |
| 2013/0279452 A1 | 10/2013 | Liu | |
| 2013/0281049 A1 | 10/2013 | Lee et al. | |
| 2013/0286851 A1* | 10/2013 | Moser | H04W 88/10 |
| | | | 370/241.1 |
| 2013/0294403 A1 | 11/2013 | Srinivasan | |
| 2013/0316692 A1* | 11/2013 | Bajj | H04W 84/045 |
| | | | 455/418 |
| 2014/0003389 A1 | 1/2014 | Wang et al. | |
| 2014/0011496 A1* | 1/2014 | Elliott | H04B 17/18 |
| | | | 455/424 |
| 2014/0013361 A1* | 1/2014 | Monari | H04N 5/23238 |
| | | | 725/62 |
| 2014/0031036 A1 | 1/2014 | Koo et al. | |
| 2014/0044057 A1 | 2/2014 | Gaal et al. | |
| 2014/0071868 A1 | 3/2014 | Bergquist et al. | |
| 2014/0086112 A1 | 3/2014 | Stern-Berkowitz et al. | |
| 2014/0120903 A1* | 5/2014 | Fuller | H04W 52/44 |
| | | | 455/422.1 |
| 2014/0120904 A1* | 5/2014 | Fuller | H04W 52/04 |
| | | | 455/423 |
| 2014/0126438 A1 | 5/2014 | Zhu et al. | |
| 2014/0147125 A1 | 5/2014 | Chow | |
| 2014/0152832 A1* | 6/2014 | Goldfeder | H04N 21/2365 |
| | | | 348/157 |
| 2014/0161070 A1 | 6/2014 | Chang et al. | |
| 2014/0162664 A1 | 6/2014 | Stapleton et al. | |

(56) References Cited

U.S. PATENT DOCUMENTS

| | | | |
|---|---|---|---|
| 2014/0177549 | A1 | 6/2014 | Knisely |
| 2014/0211690 | A1 | 7/2014 | Nama et al. |
| 2014/0212269 | A1 | 7/2014 | Kastner et al. |
| 2014/0219162 | A1 | 8/2014 | Eyuboglu et al. |
| 2014/0219255 | A1 | 8/2014 | Eyuboglu et al. |
| 2014/0219267 | A1 | 8/2014 | Eyuboglu et al. |
| 2014/0321406 | A1 | 10/2014 | Marinier et al. |
| 2015/0011219 | A1 | 1/2015 | Sally et al. |
| 2015/0085720 | A1 | 3/2015 | Gaal et al. |
| 2015/0085796 | A1 | 3/2015 | Xu et al. |
| 2015/0163682 | A1* | 6/2015 | Zarifi .................. H04W 16/26 455/446 |
| 2015/0170045 | A1* | 6/2015 | Kirkham ............... G06Q 10/06 706/11 |
| 2015/0172023 | A1 | 6/2015 | Yang et al. |
| 2015/0193282 | A1 | 7/2015 | Blocksome |
| 2015/0223201 | A1* | 8/2015 | Joshi .................... H04H 20/57 455/3.06 |
| 2015/0256297 | A1 | 9/2015 | Yang et al. |
| 2015/0304960 | A1 | 10/2015 | Yang et al. |
| 2016/0037550 | A1* | 2/2016 | Barabell ............. H04B 17/318 455/450 |
| 2016/0044548 | A1 | 2/2016 | Choi et al. |
| 2016/0127499 | A1* | 5/2016 | Meredith ............... H04L 67/04 709/224 |
| 2016/0302088 | A1 | 10/2016 | Eyuboglu et al. |
| 2016/0309347 | A1 | 10/2016 | Eyuboglu et al. |
| 2016/0345342 | A1 | 11/2016 | Eyuboglu et al. |
| 2017/0054641 | A1* | 2/2017 | Anerousis ............. H04W 24/08 |
| 2017/0077607 | A1 | 3/2017 | Han et al. |
| 2017/0132647 | A1* | 5/2017 | Bostick ............... G06Q 30/0205 |
| 2017/0135121 | A1 | 5/2017 | Eyuboglu et al. |
| 2017/0156087 | A1* | 6/2017 | Bostick ............... H04W 36/165 |
| 2017/0163330 | A1 | 6/2017 | Raleigh et al. |
| 2017/0272179 | A1* | 9/2017 | Fourie .................. H04B 17/16 |
| 2017/0317790 | A1 | 11/2017 | Yao et al. |
| 2018/0007709 | A1 | 1/2018 | Seo et al. |
| 2018/0176869 | A1* | 6/2018 | Aryafar ................ H04W 52/42 |
| 2018/0242355 | A1* | 8/2018 | Lou ...................... H04W 74/08 |
| 2018/0352386 | A1* | 12/2018 | Gunasekara ............ G06F 30/13 |
| 2019/0069190 | A1 | 2/2019 | Eyuboglu et al. |
| 2019/0075576 | A1* | 3/2019 | Eyuboglu ............ H04B 7/0626 |
| 2019/0098259 | A1* | 3/2019 | Goldfeder .......... H04N 21/2365 |
| 2019/0116505 | A1* | 4/2019 | Bhorkar ................ G06Q 50/01 |
| 2019/0159245 | A1* | 5/2019 | Park .................. H04W 74/0833 |

FOREIGN PATENT DOCUMENTS

| | | |
|---|---|---|
| CN | 102111180 A | 6/2011 |
| CN | 102340823 A | 2/2012 |
| CN | 103369582 A | 10/2013 |
| CN | 106797641 A | 5/2017 |
| CN | 108541360 A | 9/2018 |
| EP | 1134935 A2 | 9/2001 |
| EP | 1134935 B1 | 11/2008 |
| EP | 2352264 A1 | 8/2011 |
| EP | 2787646 A1 | 10/2014 |
| EP | 3094155 A1 | 11/2016 |
| WO | 2008144363 A3 | 3/2009 |
| WO | 2010078811 A1 | 7/2010 |
| WO | 2013036029 A1 | 3/2013 |
| WO | 2014124160 A2 | 8/2014 |
| WO | 2014153125 A1 | 9/2014 |
| WO | 2015191530 A2 | 12/2015 |
| WO | 2017100096 A1 | 6/2017 |

OTHER PUBLICATIONS

"3rd Generation Partnership Project; Technical Specification Group Radio Access Network; Evolved Universal Terrestrial Radio Access (E-UTRA); Base Station (BS) radio transmission and reception", 3GPP, Dec. 2007, pp. 1-47, 3GPP Organizational Partners.

"Small Cell Virtualization Functional Splits and Use Cases", Small Cell Forum, Jun. 2015, pp. 1-58, www.smallcellforum.com.

Belhouchet et al., "4G Wireless Systems, LTE Technology, Session 3: LTE Overview—Design Targets and Multiple Access Technologies", ITU/BDT Arab Regional Workshop, 2010, pp. 1-82, ERT.

Dotsch, et al., "Quantitative Analysis of Split Base Station Processing and Determination of Advantageous Architectures for LTE", Bell Labs Technical Journal, 2013, pp. 1-24, vol. 18, No. 1, Wiley Periodicals.

European Patent Office, "Communication of European publication number and information on the application of Article 67(3) from EP Application No. 14707024.7 dated Nov. 18, 2015", from Foreign Counterpart to U.S. Appl. No. 13/762,283, p. 1, Published: EP.

European Patent Office, "Communication pursuant to Article 94(3) from EP Application No. 14707024.7 dated May 2, 2018", from Foreign Counterpart to U.S. Appl. No. 13/762,283, pp. 1-5, Published: EP.

European Patent Office, "Communication pursuant to Article 94(3) from EP Application No. 14707024.7 dated Oct. 5, 2016", from Foreign Counterpart to U.S. Appl. No. 13/762,283, pp. 1-6, Published: EP.

European Patent Office, "Communication pursuant to Article 94(3) from EP Application No. 15731443.6 dated Feb. 5, 2019", from Foreign Counterpart to U.S. Appl. No. 14/734,311, pp. 1-5, Published: EP.

European Patent Office, "Extended European Search Report from EP Application No. 16175955.0 dated Oct. 10, 2016", from Foreign Counterpart to U.S. Appl. No. 13/762,283, pp. 110, Published: EP.

European Patent Office, "Extended European Search Report from EP Application No. 16175956.8 dated Oct. 10, 2016", from Foreign Counterpart to U.S. Appl. No. 13/762,283, pp. 1-10, Published: EP.

Garner, "IEEE 1588 Version 2", ISPCS, Sep. 24, 2008, pp. 1-89.

Haberland et al., "Base Stations in the Cloud", Alcatel-Lucent, Sep. 28, 2012, pp. 1-23, www.alcatel-lucent.com.

International Bureau, "International Preliminary Report on Patentability from PCT Application No. PCT/US2014/015137 dated Aug. 20, 2015", from Foreign Counterpart to U.S. Appl. No. 13/762,283, pp. 1-13, Published: WO.

International Searching Authority, "International Search Report and Written Opinion from PCT Application No. PCT/US2014/015137 dated Sep. 22, 2014", from Foreign Counterpart to U.S. Appl. No. 13/762,283, pp. 1-18, Published: WO.

International Searching Authority, "International Search Report and Written Opinion from PCT Application No. PCT/US2019/035555 dated Sep. 26, 2019", from Foreign Counterpart to U.S. Appl. No. 16/432,314, pp. 1-11, Published: WO.

International Searching Authority, "Invitation to Pay Additional Fee from PCT Application No. PCT/US2014/015137 dated Aug. 4, 2014", from Foreign Counterpart to U.S. Appl. No. 13/762,283, pp. 1-8, Published: EP.

Ma et al., "RADIOSTAR: Providing Wireless Coverage Over Gigabit Ethernet", Bell Labs Technical Journal, 2009, pp. 1-18, vol. 14, No. 1, Wiley Periodicals.

U.S. Patent and Trademark Office, "Corrected Notice of Allowability", U.S. Appl. No. 15/230,936, dated Mar. 9, 2018, pp. 1-26, Published: US.

U.S. Patent and Trademark Office, "Corrected Notice of Allowability", U.S. Appl. No. 15/230,936, dated Aug. 24, 2018, pp. 1-10, Published: US.

U.S. Patent and Trademark Office, "Corrected Notice of Allowability", U.S. Appl. No. 15/231,384, dated Aug. 24, 2019, pp. 1-6, Published: US.

U.S. Patent and Trademark Office, "Final Office Action", U.S. Appl. No. 13/762,283, dated Aug. 21, 2015, pp. 1-47, Published: US.

U.S. Patent and Trademark Office, "Final Office Action", U.S. Appl. No. 15/230,936, dated Nov. 8, 2017, pp. 1-48, Published: US.

U.S. Patent and Published: US Trademark Office, "Notice of Allowance", U.S. Appl. No. 13/762,283, dated Apr. 1, 2016, pp. 1-9, Published: US.

U.S. Patent and Trademark Office, "Notice of Allowance", U.S. Appl. No. 15/230,936, dated Feb. 9, 2018, pp. 1-10, Published: US.

U.S. Patent and Trademark Office, "Notice of Allowance", U.S. Appl. No. 15/230,936, dated Apr. 22, 2019, pp. 1-13, Published: US.

(56) References Cited

OTHER PUBLICATIONS

U.S. Patent and Trademark Office, "Notice of Allowance", U.S. Appl. No. 15/230,936, dated Jul. 2, 2018, pp. 1-15, Published: US.
U.S. Patent and Trademark Office, "Notice of Allowance", U.S. Appl. No. 15/230,936, dated Aug. 9, 2019, pp. 1-22, Published: US.
U.S. Patent and Trademark Office, "Notice of Allowance", U.S. Appl. No. 15/230,936, dated Oct. 29, 2018, pp. 1-15, Published: US.
U.S. Patent and Trademark Office, "Notice of Allowance", U.S. Appl. No. 15/231,384, dated Nov. 28, 2018, pp. 1-15, Published: US.
U.S. Patent and Trademark Office, "Office Action", U.S. Appl. No. 13/762,283, dated Nov. 21, 2014, pp. 1-39, Published: US.
U.S. Patent and Trademark Office, "Office Action", U.S. Appl. No. 15/230,936, dated Jan. 12, 2017, pp. 1-10, Published: US.
U.S. Patent and Trademark Office, "Office Action", U.S. Appl. No. 15/230,936, dated Jun. 15, 2017, pp. 1-60, Published: US.
U.S. Patent and Trademark Office, "Office Action", U.S. Appl. No. 15/231,384, dated Jul. 12, 2018, pp. 1-82, Published: US.
U.S. Patent and Trademark Office, "Restriction Requirement", U.S. Appl. No. 16/182,392, dated Oct. 17, 2019, pp. 1-7, Published: US.
Zhu et al., "Virtual Base Station Pool: Towards a Wireless Network Cloud for Radio Access Networks", May 17, 2010, pp. 1-10.
Canadian Intellectual Property Office, "Office Action from CA Application No. 2938949", from Foreign Counterpart to U.S. Appl. No. 13/762,283, dated Dec. 16, 2019, pp. 1-3, Published: CA.
U.S. Patent and Trademark Office, "Office Action", U.S. Appl. No. 16/182,392, dated Dec. 31, 2019, pp. 1-105, Published: US.
European Patent Office, "Communication pursuant to Article 94(3) from EP Application No. 16175955.0", from Foreign Counterpart to U.S. Appl. No. 13/762,283, dated Feb. 10, 2020, pp. 1-6, Published: EP.
European Patent Office, "Communication pursuant to Article 94(3) from EP Application No. 16175956.8", from Foreign Counterpart to U.S. Appl. No. 13/762,283, dated Feb. 10, 2020, pp. 1-8, Published: EP.
U.S. Patent and Trademark Office, "Office Action", U.S. Appl. No. 16/182,392, dated May 21, 2020, pp. 1 through 69, Published: US.

\* cited by examiner

AUTOMATIC TRANSMIT POWER CONTROL FOR RADIO POINTS OF A CENTRALIZED RADIO ACCESS NETWORK THAT PRIMARILY PROVIDE WIRELESS SERVICE TO USERS LOCATED IN AN EVENT AREA OF A VENUE

CROSS-REFERENCE TO RELATED APPLICATION

This application claims the benefit of U.S. Provisional Patent Application Ser. No. 62/682,472, filed on Jun. 8, 2018, and titled "AUTOMATIC TRANSMIT POWER CONTROL FOR RADIO POINTS OF A CENTRALIZED RADIO ACCESS NETWORK THAT PRIMARILY PROVIDE WIRELESS SERVICE TO USERS LOCATED IN AN EVENT AREA OF A VENUE", which is hereby incorporated herein by reference.

BACKGROUND

A centralized radio access network (C-RAN) can be used to implement base station functionality for providing wireless service to user equipment (UE). Typically, for each cell implemented by the C-RAN, one or more baseband units (BBUs) (also referred to here as "baseband controllers" or simply "controllers") interact with multiple remote units (also referred to here as "radio points" or "RPs"). Each controller is coupled to the radio points over front-haul communication links or a front-haul network.

C-RANs are often used in venues in which events are held. Examples of such venues include stadiums and arenas. Typically, a venue includes an area where the event occurs (also referred to here as the "event area"). The event area is surrounded by seating areas where spectators can sit and view the event. In one example, the venue comprises a stadium that includes a pitch or field on which a sporting event can be played, where the pitch is surrounded by seating areas where spectators can sit and view the sporting event. In another example, the venue comprises an arena that includes a court or other area (such as a rink, tennis court, etc.) on which a sporting event can be played, where the court is surrounded by seating areas where spectators can sit and view the sporting event. To provide wireless service coverage for spectators in the seating areas of the venue, radio points and their associated antennas are commonly mounted around the outer edge of the event area with their antennas directed away from the event area toward the seating areas that surround the event area. These radio points and antennas are also referred to here as "seating" radio points and antennas. Multiple sectors or cells of wireless capacity can be provided by homing different groups of the radio points to different controllers. If only these seating radio points were to be used, the resulting coverage area would have a donut shape with a hole in the middle where the event area is located. This type of coverage area is suitable when the venue hosts a sporting event.

Venues (such as stadiums and arenas) are also typically used to host events such as concerts where some spectators (or other visitors or customers) are located in the event area (for example, on the pitch of a stadium or on the court area of an arena). To provide coverage to spectators located in the event area, some radio points and associated antennas are typically mounted on the flood light (or similar) structures with the antennas directed toward the event area and away from the seating areas that surround the event area. These radio points and antennas are also referred to here as "event" radio points and antennas. Because the flood light structures are located quite high in the venue, the event radio points and antennas are positioned much higher than the seating radio points and antennas. As a result, signals transmitted from the event radio points and antennas tend to bleed into the seating areas and the coverage areas of the seating radio points, which can result in interference between different cells and reduce isolation between radio points and opportunities for intra-cell frequency reuse.

However, having venue or wireless operator personnel manually turn the event radio points on for concert events and turn them off for sporting events is undesirable due to the possibility for human error. For example, such personnel could forget to turn the event radio points on for a concert event or accidently turn off the wrong radio points for a sporting event.

SUMMARY

One embodiment is directed to a system to provide wireless service to user equipment using an air interface in a venue having an event area. The system comprises a controller communicatively coupled to a core network and a plurality of radio points to transmit and receive radio frequency signals to and from the user equipment. Each of the radio points is associated with at least one antenna and located remote from the controller. The controller configured to perform at least some Layer-3, Layer-2, and Layer-1 processing for the air interface. A subset of the radio points is mounted in or near the venue so as to primarily provide wireless coverage to user equipment located in the event area. The controller is configured to automatically perform the following: if the subset of radio points is operated in a reduced transmit power state: determine if conditions associated with the plurality of radio points indicate that spectators are located in the event area of the venue; and cause the subset of radio points to be operated in a normal transmit power state in response to determining that the conditions associated with the plurality of radio points indicate that spectators are located in the event area of the venue; and, if the subset of radio points is operated in the normal transmit power state: determine if the conditions associated with the plurality of radio points indicate that spectators are not located in the event area of the venue; and cause the subset of radio points to be operated in the reduced transmit power state in response to determining that the conditions associated with the plurality of radio points indicate that spectators are not located in the event area of the venue.

Another embodiment is directed to a method of performing automatic transmit power in a centralized radio access network (C-RAN) system comprising a controller communicatively coupled to a core network and a plurality of radio points to transmit and receive radio frequency signals to and from user equipment. Each of the radio points associated with at least one antenna and located remote from the controller. The controller is configured to perform at least some Layer-3, Layer-2, and Layer-1 processing for the air interface. A subset of the radio points is mounted in or near a venue so as to primarily provide wireless coverage to user equipment located in an event area of the venue. The method comprises, if the subset of radio points is operated in a reduced transmit power state: determining by the controller if conditions associated with the plurality of radio points indicate that spectators are located in the event area of the venue and causing the subset of radio points to be operated in a normal transmit power state in response to determining that the conditions associated with the plurality of radio points indicate that spectators are located in the event area of the venue. The method further comprises, if the subset of radio points is operated in the normal transmit power state: determining by the controller if the conditions associated with the plurality of radio points indicate that spectators are not located in the event area of the venue and causing the subset of radio points to be operated in the reduced transmit power state in response to determining that the conditions associated with the plurality of radio points indicate that spectators are not located in the event area of the venue.

DRAWINGS

Like reference numbers and designations in the various drawings indicate like elements.

DETAILED DESCRIPTION

Figure 1:
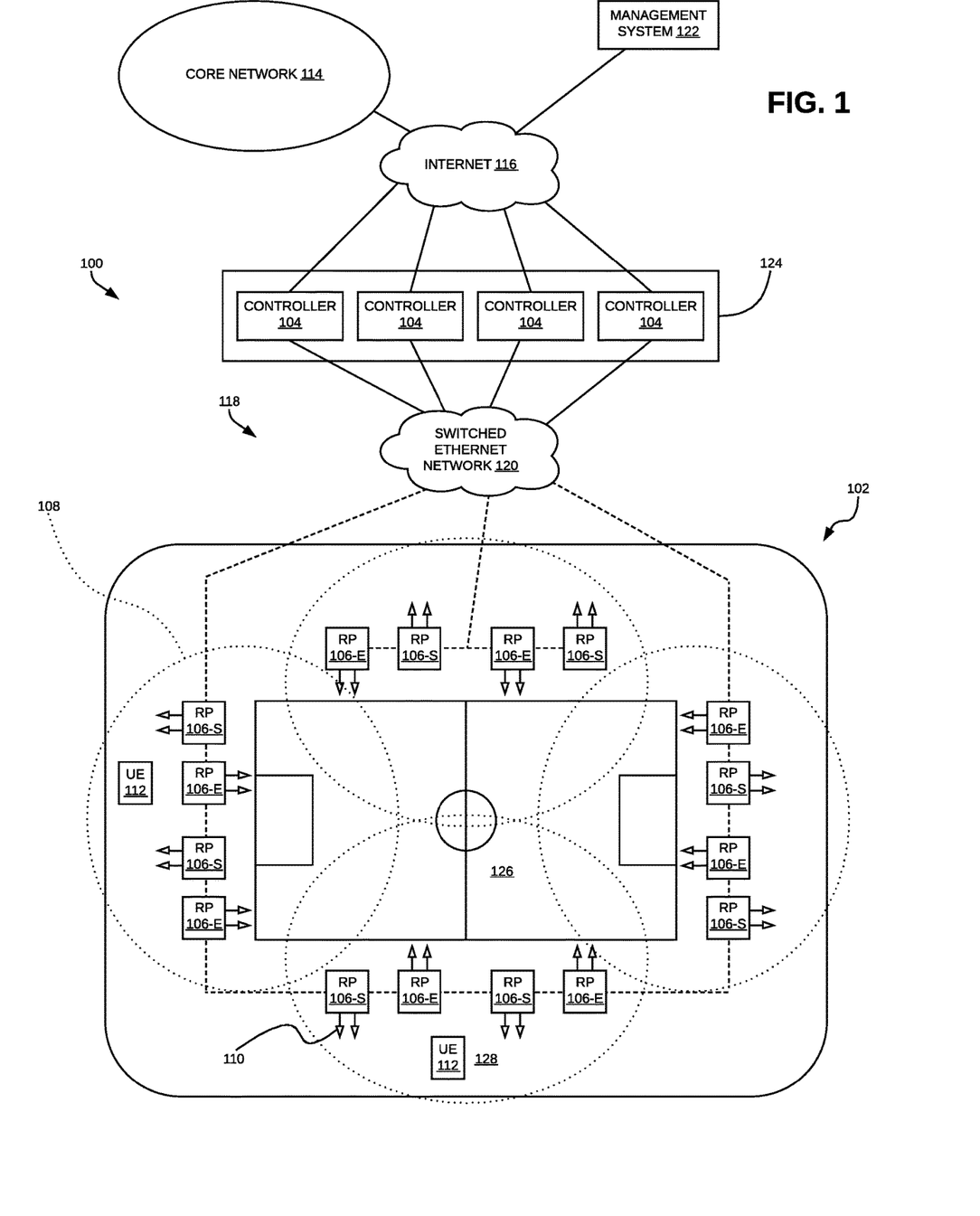
FIG. 1 is a block diagram illustrating one exemplary embodiment of a radio access network (RAN) system.

FIG. 1 is a block diagram illustrating one exemplary embodiment of a radio access network (RAN) system 100 in which the automatic transmit power control features described here can be used. The system 100 is deployed in a venue 102 to provide wireless coverage and capacity for one or more wireless network operators throughout the venue 102. Examples of venues 102 includes stadiums and arenas.

In the exemplary embodiment shown in FIG. 1, the system 100 is implemented at least in part using a C-RAN architecture that employs multiple baseband units 104 and multiple radio points (RPs) 106. The system 100 is also referred to here as a "C-RAN system" 100. Each RP 106 is remotely located from the baseband units 104. Also, in this exemplary embodiment, at least one of the RPs 106 is remotely located from at least one other RP 106. The baseband units 104 and RPs 106 serve at least one cell 108. The baseband units 104 are also referred to here as "baseband controllers" 104 or just "controllers" 104.

Each RP 106 includes or is coupled to one or more antennas 110 via which downlink RF signals are radiated to user equipment (UE) 112 and via which uplink RF signals transmitted by UEs 112 are received.

The system 100 is coupled to the core network 114 of each wireless network operator over an appropriate back-haul. In the exemplary embodiment shown in FIG. 1, the Internet 116 is used for back-haul between the system 100 and each core network 114. However, it is to be understood that the back-haul can be implemented in other ways.

The exemplary embodiment of the system 100 shown in FIG. 1 is described here as being implemented as a Long Term Evolution (LTE) radio access network providing wireless service using an LTE air interface. LTE is a standard developed by 3GPP standards organization. In this embodiment, the controllers 104 and RPs 106 together are used to implement one or more LTE Evolved Node Bs (also referred to here as an "eNodeBs" or "eNBs") that are used to provide user equipment 112 with mobile access to the wireless network operator's core network 114 to enable the user equipment 112 to wirelessly communicate data and voice (using, for example, Voice over LTE (VoLTE) technology). These eNodeBs can be macro eNodeBs or home eNodeBs (HeNB).

Also, in this exemplary LTE embodiment, each core network 114 is implemented as an Evolved Packet Core (EPC) 114 comprising standard LTE EPC network elements such as, for example, a mobility management entity (MME) and a Serving Gateway (SGVV) and a Security Gateway (SeGW) (all of which are not shown). Each controller 104 communicates with the MME and SGW in the EPC core network 114 using the LTE S1 interface over an Internet Protocol Security (IPsec) tunnel established with the SeGW. Also, each controller 104 communicates with other eNodeBs (over the IPsec tunnel) using the LTE X2 interface. For example, each controller 104 can communicate via the LTE X2 interface with an outdoor macro eNodeB (not shown) or another controller 104 in the same cluster 124 (described below) implementing a different cell 108.

If the eNodeB implemented using one or more controllers 104 is a home eNodeB, the core network 114 can also include a Home eNodeB Gateway (not shown) for aggregating traffic from multiple home eNodeBs.

The controllers 104 and the radio points 106 can be implemented so as to use an air interface that supports one or more of frequency-division duplexing (FDD) and/or time-division duplexing (TDD). Also, the controllers 104 and the radio points 106 can be implemented to use an air interface that supports one or more of the multiple-input-multiple-output (MIMO), single-input-single-output (SISO), single-input-multiple-output (SIMO), multiple-input-single-output (MISO), and/or beam forming schemes. For example, the controllers 104 and the radio points 106 can implement one or more of the LTE transmission modes. Moreover, the controllers 104 and/or the radio points 106 can be configured to support multiple air interfaces and/or to support multiple wireless operators.

The controllers 104 are communicatively coupled the radio points 104 using a front-haul network 118. In the exemplary embodiment shown in FIG. 1, the front-haul 118 that communicatively couples each controller 104 to one or more RPs 106 is implemented using a standard switched ETHERNET network 120. However, it is to be understood that the front-haul between the controllers 104 and RPs 106 can be implemented in other ways.

Generally, one or more nodes in a C-RAN perform analog radio frequency (RF) functions for the air interface as well as digital Layer 1, Layer 2, and Layer 3 (of the Open Systems Interconnection (OSI) model) functions for the air interface.

In the exemplary embodiment shown in FIG. 1, each baseband controller 104 comprises Layer-3 (L3) functionality, Layer-2 (L2) functionality, and Layer-1 (L1) functionality configured to perform at least some of the Layer-3 processing, Layer-2 processing, and Layer-1 processing, respectively, for the LTE air interface implemented by the C-RAN system 100, and each RP 106 includes (optionally) Layer-1 functionality that implements any Layer-1 processing for the air interface that is not performed in the controller 104 and one or more radio frequency (RF) circuits that implement the RF front-end functions for the air interface and the one or more antennas 110 associated with that RP 106.

Each baseband controller 104 can be configured to perform all of the digital Layer-3, Layer-2, and Layer-1 processing for the air interface, while the RPs 106 (specifically, the RF circuits) implement only the RF functions for the air interface and the antennas 108 associated with each RP 106. In that case, IQ data representing time-domain symbols for the air interface is communicated between the controller 104 and the RPs 106. Communicating such time-domain IQ data typically requires a relatively high data rate front haul. This approach (communicating time-domain IQ data over the front haul) is suitable for those implementations where the front-haul switched ETHERNET network 120 is able to deliver the required high data rate.

If the front-haul ETHERNET network 120 is not able to deliver the data rate needed to front haul time-domain IQ data (for example, where the front-haul is implemented using typical enterprise-grade ETHERNET networks), this issue can be addressed by communicating IQ data representing frequency-domain symbols for the air interface between the controllers 104 and the RPs 106. This frequency-domain IQ data represents the symbols in the frequency domain before the inverse fast Fourier transform (IFFT) is performed. The time-domain IQ data can be generated by quantizing the IQ data representing the frequency-domain symbols without guard band zeroes or any cyclic prefix and communicating the resulting compressed, quantized frequency-domain IQ data over the front-haul switched ETHERNET network 120. Additional details regarding this approach to communicating frequency-domain IQ data can be found in U.S. patent application Ser. No. 13/762,283, filed on Feb. 7, 2013, and titled "RADIO ACCESS NETWORKS," which is hereby incorporated herein by reference.

Where frequency-domain IQ data is front-hauled between the controllers 104 and the RPs 106, each baseband controller 104 can be configured to perform all or some of the digital Layer-3, Layer-2, and Layer-1 processing for the air interface. In this case, the Layer-1 functions in each RP 106 can be configured to implement the digital Layer-1 processing for the air interface that is not performed in the controller 104.

Where the front-haul switched ETHERNET network 120 is not able to deliver the data rate need to front haul (uncompressed) time-domain IQ data, the time-domain IQ data can be compressed prior to being communicated over the ETHERNET network 120, thereby reducing the data rate needed communicate such IQ data over the ETHERNET network 116.

Data can be front-hauled between the controllers 104 and RPs 106 in other ways (for example, using front-haul interfaces and techniques specified in the Common Public Radio Interface (CPRI) and/or Open Base Station Architecture Initiative (OBSAI) family of specifications).

Each controller 104 and RP 106 (and the functionality described as being included therein) can be implemented in hardware, software, or combinations of hardware and software, and the various implementations (whether hardware, software, or combinations of hardware and software) can also be referred to generally as "circuitry" or a "circuit" configured to implement at least some of the associated functionality. When implemented in software, such software can be implemented in software or firmware executing on one or more suitable programmable processors. Such hardware or software (or portions thereof) can be implemented in other ways (for example, in a field programmable gate array (FPGA), application specific integrated circuit (ASIC), etc.). Also, the RF functionality can be implemented using one or more RF integrated circuits (RFICs) and/or discrete components. Each controller 104 and RP 106 can be implemented in other ways.

In the exemplary embodiment shown in FIG. 1, a management system 122 is communicatively coupled to the controllers 104 and RPs 106, for example, via the Internet 116 and front-haul switched ETHERNET network 120 (in the case of the RPs 106).

In the exemplary embodiment shown in FIG. 1, the management system 122 communicates with the various elements of the system 100 using the Internet 116 and the switched ETHERNET network 120. Also, in some implementations, the management system 122 sends and receives management communications to and from the controllers 104, each of which in turn forwards relevant management communications to and from the RPs 106. The management system 122 can comprise a proprietary management system provided by the vendor of the C-RAN system 100 or a Home eNodeB management system (HeNB MS) (or other eNodeB management system) used by an operator to manage Home eNodeBs (or other eNodeBs) deployed in its network.

Each controller 104 can also implement a management interface by which a user is able to directly interact with the controller 104. This management interface can be implemented in various ways including, for example, by implementing a web server that serves web pages that implement a web-based graphical user interface for a user to interact with the controller 104 using a web browser and/or by implementing a command-line interface by which a user is able to interact with the controller 104, for example, using secure shell (SSH) software.

In the exemplary embodiment shown in FIG. 1, the system 100 comprises multiple controllers 104 that are grouped together into a cluster 124. Each cluster 124 has an associated set of RPs 106 that have been assigned to that cluster 124 and that are served by the controllers 104 included in that cluster 124. Each controller 104 in the cluster 124 maintains a list of the RPs 106 assigned to the cluster 124. This list is also referred to here as the "RP whitelist" and comprises an identifier for each RP 106 that has been assigned to the cluster 124. In this exemplary embodiment, the identifier for each RP 106 that is used in the RP whitelist is a media access control (MAC) address assigned to that RP 106.

In this example, the venue 102 includes an event area 126 in which an event occurs. The event area 126 is surrounded by seating areas 128 where spectators can sit and view the event occurring in the event area 126. For example, where the venue 102 comprises a stadium, the event area 126 is a pitch or field on which a sporting event can be played, where the pitch is surrounded by the seating areas 128 where spectators can sit and view the sporting event. In another example where the venue 102 comprises an arena, the event area 126 is a court or other area (such as a rink, tennis court, etc.) on which a sporting event can be played, where the court is surrounded by the seating areas 128 where spectators can sit and view the sporting event. To provide wireless service coverage for spectators in the seating areas 128 of the venue 102, a subset of the radio points 106-S and their associated antennas 110-S are mounted around the outer edge of the event area 126 with their antennas 110 directed away from the event area 126 toward the seating areas 128 surrounding the event area 126. These radio points 106 and antennas 110 are also referred to here as "seating" radio points 106-S and antennas 106-S and are separately referenced in FIG. 1 using the suffix "-S". In only these seating radio points 106-S were to be used, the resulting coverage area provided by these seating radio points 106-S would tend to have a donut shape with a hole in the middle where the event area 126 is located. As noted above, this type of coverage area is suitable when the venue 102 hosts a sporting event.

The venue 102 is also used to host events such as concerts where some spectators (or other visitors or customers) are located in the event area 126. To provide coverage to spectators located in the event area 126, a subset of the radio points 106-E and associated antennas 110-E are typically mounted on flood light (or similar) structures in the venue 102 with the antennas 110-E directed toward the event area 126 and away from the seating areas 128 that surround the event area 126. These radio points 106-E and antennas 110-E are also referred to here as "event" radio points 106-E and antennas 110-E and are separately referenced in FIG. 1 using the suffix "-E". The management system 122 can be used to manually designate which radio points 106 are event radio points 106-E.

Figure 2:
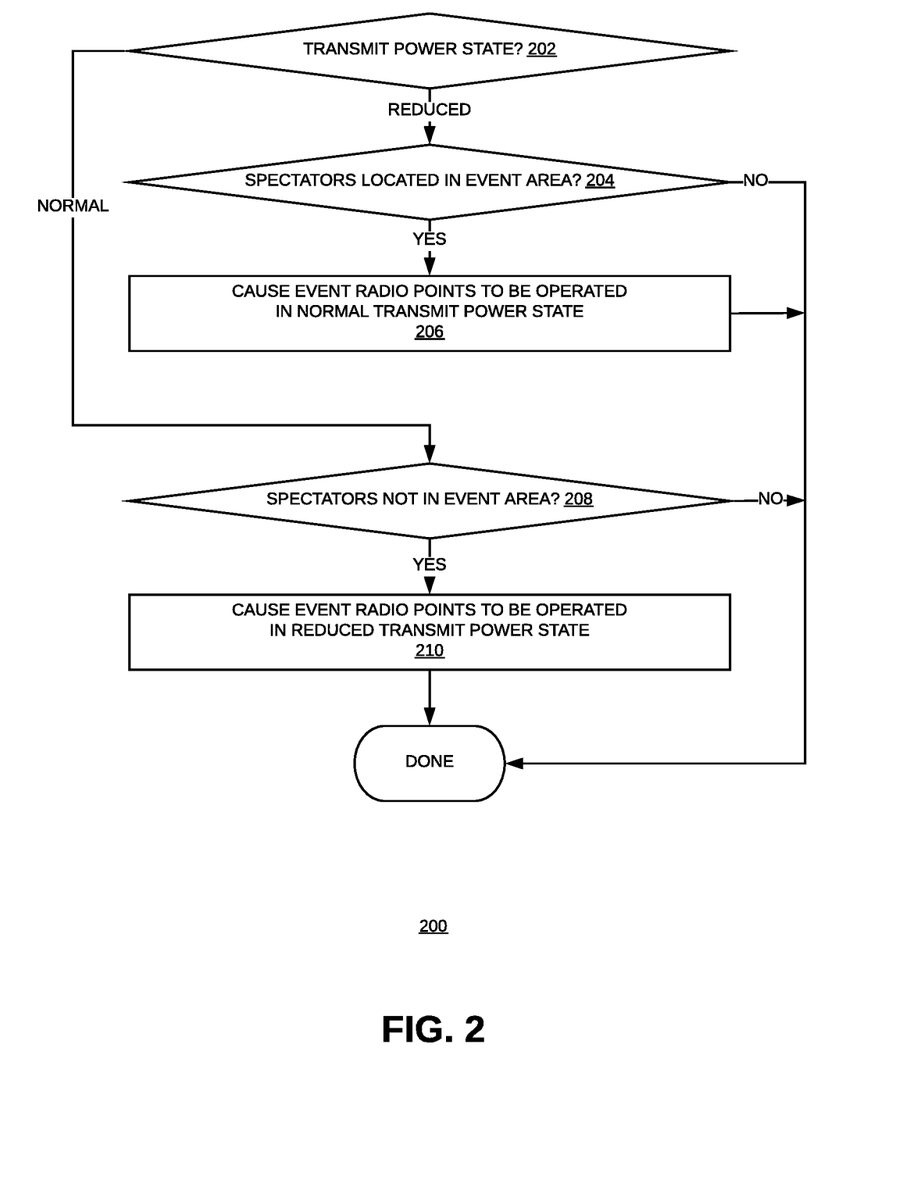
FIG. 2 comprises a high-level flowchart illustrating one exemplary embodiment of a method of performing automatic transmit power control for event radio points of a C-RAN.

FIG. 2 comprises a high-level flowchart illustrating one exemplary embodiment of a method 200 of performing automatic transmit power control for event radio points 106-E of a C-RAN 100. The embodiment of method 200 shown in FIG. 2 is described here as being implemented in the C-RAN 100 described above in connection with FIG. 1, though it is to be understood that other embodiments can be implemented in other ways.

The blocks of the flow diagram shown in FIG. 2 have been arranged in a generally sequential manner for ease of explanation; however, it is to be understood that this arrangement is merely exemplary, and it should be recognized that the processing associated with method 200 (and the blocks shown in FIG. 2) can occur in a different order (for example, where at least some of the processing associated with the blocks is performed in parallel and/or in an event-driven manner). Also, most standard exception handling is not described for ease of explanation; however, it is to be understood that method 200 can and typically would include such exception handling.

The particular controller 104 that method 200 is described here as being performed for is referred to here as the "current" controller 104. The automatic transmit power control for the event radio points 106-E implemented by method 200 causes each of the event radio points 106-E homed to the current controller 104 to be operated in either a "normal" transmit power state or a "reduced" transmit power state.

In this exemplary embodiment, method 200 is performed periodically (for example, once every 15 minutes).

In this exemplary embodiment, the default transport power state for the event radio points 106-E is the reduced transport power state. This is because the vast majority of time spectators are not permitted in the event area 126— either because a sporting event is occurring at the venue 102 or because no event at all is occurring at the venue 102.

While the event radio points 106-E homed to the current controller 104 are operated in the reduced transmit power state (checked in block 202), if the current controller 104 determines that the conditions associated with the radio points 106 indicate that spectators are in the event area 126 (block 204), the current controller 104 causes the event radio points 106-E homed to it to be operated in the normal transmit power state (block 206).

While the event radio points 106-E homed to the current controller 104 are operated in the normal transmit power state (checked block 202), if the current controller 104 determines that the conditions associated with the radio points 106 indicate that spectators are not in the event area 126 (block 208), the current controller 104 causes the event radio points 106-E homed to it to be operated in the reduced transport power state (block 210).

While operating in the normal transmit power state, each event radio point 106-E transmits at a "normal" transmit power level. In this exemplary embodiment, the normal transmit power level corresponds to the configured transmit power level used by the seating radio points 106-S homed to the current controller 104. While operating in the reduced transmit power state, each event radio point 106-E transmits at a "reduced" transmit power level that is reduced relative to the normal transmit power level. The amount of transmit power reduction used in the reduced transmit power state can be determined experimentally. For example, in one implementation, the transmit power levels of the event radio points 106-E are reduced by 8 dB when operated in the reduced transmit power state. Other embodiments, however, can be implemented in other ways.

As noted above, because the flood light (or similar) structures to which the event radio points 106-E are typically mounted are located quite high in the venue 102, the event radio points 106-E and associated antennas 110-E are positioned much higher than the seating radio points 106-S and antennas 110-S. As a result, signals transmitted from the event radio points 106-E and antennas 110-E at normal transmit power levels tend to bleed into the seating areas 128 and the coverage areas of the seating radio points 106-S, which can result in interference between different cells 108 and reduce isolation between radio points 106 and opportunities for intra-cell frequency reuse. However, when the event radio points 106-E are operated in a reduced transit power state, the problems associated with operating the event radio points 106-E in the normal transmit power state can be reduced or avoided entirely. Therefore, by having each controller 104 automatically cause the event radio points 106-E homed to it to be operated in the reduced transmit power state when spectators are not in the event area 126 and automatically cause those event radio points 106-E to be operated in the normal transmit power state when spectators are in the event area 126, the problems associated with operating the event radio points 106-E in the normal transmit power state can be reduced or avoided entirely when it is not necessary for the event radio points 106-E to transmit in the normal transmit power state because spectators are not in the event area 126. Also, because each controller 104 does this automatically (that is, without requiring the intervention of personnel of the venue or the wireless operator), errors resulting from human error can be avoided.

The event radio points 106-E are operated in a reduced transmit power state, instead of being powered off completely, so that the event radio points 106-E can still be used by the current controller 104 to dynamically detect conditions in the venue 102. If the event radio points 106-E were completely powered off, this would not be possible.

Although the automatic transmit power control technique described here in connection with method 200 is described in the context of a single controller 104, it is to be understood that the determination as to whether spectators are located in the event area 126 of the venue 102 can be made by a single "master" controller 104 for all of the controllers 104 in the cluster 124 or each controller 104 can make that determination independently. Also, the conditions associated with the plurality of radio points 106 used by any such controller 104 making that determination can be the conditions associated with only the radio points 106 homed to that particular controller 104 or can be the conditions associated with more than just the radio points 106 homed to that particular controller 104 (for example, the conditions associated with all of the radio points 106 in the C-RAN 100, regardless of which controllers 104 they are homed to).

The exemplary embodiment of method 200 described above in connection with FIG. 2 is only one example and it is to be understood that other embodiments can be implemented in other ways.

A controller 104 can determine whether or not the conditions associated with the radio points 106 indicate that spectators are or are not in the event area 126 in various ways. In the exemplary embodiment described here in connection with FIG. 1, a "signature vector" (SV) is determined for each UE 112. The signature vector is determined based on receive power measurements made at each of the RPs 106. When a UE 112 makes initial LTE Physical Random Access Channel (PRACH) transmissions to access a cell 108 served by the C-RAN 100, one or more RPs 106 will receive those initial PRACH transmissions. Each RP 106 is configured to detect uplink PRACH transmissions that it has received (that is, each RP 106 is configured to detect when UEs 112 are attempting to access the associated cell 108). Each RP 106 is also configured to, when it determines that it has received a PRACH transmission from a UE 112, communicate IQ data for the PRACH transmission to its serving controller 104 for further processing and to determine, a signal reception metric indicative of the power level of the received PRACH transmission as received by that RP 106 for that UE 112. One example of such a signal reception metric is a signal-to-noise plus interference ratio (SNIR). The signal reception metrics that are determined based on the PRACH transmissions are also referred to here as "PRACH metrics." The initial version of the signature vector for each UE 112 is created based on the PRACH metrics for that UE 112. This initial version of the signature vector for a UE 112 is also referred to here as the "uplink PRACH signature vector" for that UE 112.

The signature vector for each UE 112 is updated over the course of that UE's connection to the cell 108 based on Sounding Reference Signals (SRS) transmitted by the UE 112. A signal reception metric indicative of the power level of the SRS transmissions received by the RPs 106 (for example, a SNIR) is measured (or otherwise determined). The signal reception metrics that are determined based on the SRS transmissions are also referred to here as "SRS metrics." The updated versions of the signature vector for each UE 112 are created based on the SRS metrics for that UE 112. Each of these updated versions of the signature vector for a UE 112 is also referred to here as the "uplink functional signature vector" for that UE 112.

Each signature vector is a set of floating point signal-to-interference-plus-noise ratio (SINR) values (or other metric), with each value or element corresponding to a RP 106 used to serve the cell 108.

The signature vector can be used to determine the RP 106 having the best signal reception metric by scanning or sorting the elements of the signature vector to find the element having the best signal reception metric. The RP 106 that corresponds to that "best" element is also referred to here as the "primary RP 106" for the UE 112.

The signature vector (and the primary RP 106 determined therefrom) can be used to estimate the location of the UE 112. In general, it is expected that a UE 112 will be located in the coverage area of its primary RP 106, which is the reason why that RP 106 has the best signal reception metric for that UE 112. Also, the number of PRACH transmissions that can be detected by a radio point 106 is an indication of the amount of UEs 112 that are in the coverage area of that radio point 106. Both of these facts can be used by a controller 104 to determine whether or not the conditions associated with the radio points 106 homed to it indicate that spectators are in the event area 126. One example of how this can be done is shown in FIG. 3.

Figure 3:
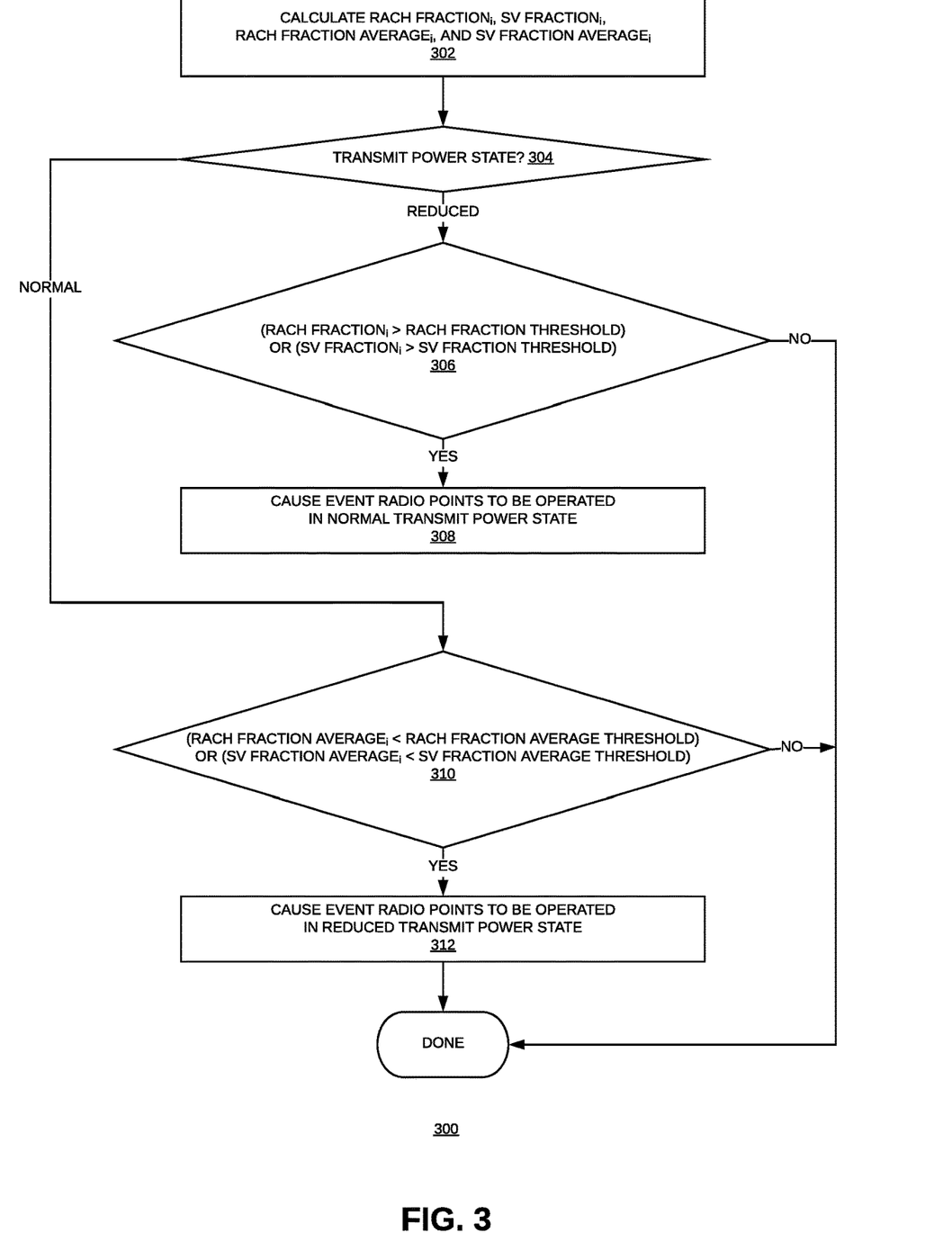
FIG. 3 comprises a high-level flowchart illustrating another exemplary embodiment of a method of performing automatic transmit power control for event radio points of a C-RAN.

FIG. 3 comprises a high-level flowchart illustrating another exemplary embodiment of a method 300 of performing automatic transmit power control for event radio points 106-E of a C-RAN 100. The embodiment of method 300 shown in FIG. 3 is described here as being implemented in the C-RAN 100 described above in connection with FIG. 1, though it is to be understood that other embodiments can be implemented in other ways.

The blocks of the flow diagram shown in FIG. 3 have been arranged in a generally sequential manner for ease of explanation; however, it is to be understood that this arrangement is merely exemplary, and it should be recognized that the processing associated with method 300 (and the blocks shown in FIG. 3) can occur in a different order (for example, where at least some of the processing associated with the blocks is performed in parallel and/or in an event-driven manner). Also, most standard exception handling is not described for ease of explanation; however, it is to be understood that method 300 can and typically would include such exception handling.

The particular controller 104 that method 300 is described here as being performed for is referred to here as the "current" controller 104. As with the embodiment shown in FIG. 2, the automatic transmit power control for the event radio points 106-E implemented by method 300 causes each of the event radio points 106-E homed to the current controller 104 to be operated in either a "normal" transmit power state or a "reduced" transmit power state.

In this exemplary embodiment, method 300 is performed periodically (for example, once every 15 minutes).

In this exemplary embodiment, the controller 104 is configured to track the number of PRACH transmissions that are detected by its associated event radio points 106-E over a predetermined window of time. Also, in this embodiment, the controller 104 is also configured to track the number of PRACH transmissions that are detected by its associated seating radio points 106-S over the predetermined window. The controller 104 is configured to then calculate a first fraction by dividing the number of PRACH transmissions detected by its associated event radio points 106-E over the predetermined window of time by the number of PRACH transmissions detected by its associated seating radio points 106-S over the predetermined window of time. This fraction is also referred to here as the "RACH FRACTION$_i$," calculated at a point in time i.

In this exemplary embodiment, the controller 104 is also configured to track the number of UEs 112 that have one of its associated event radio points 106-E as their primary RP 106 based on their uplink PRACH signature vectors. In this embodiment, the controller 104 is also configured to track the number of UEs 112 that have one of its associated seating radio points 106-S as their primary RP 106 based on their uplink PRACH signature vectors. The controller 104 is configured to calculate a second fraction by dividing the number of UEs 112 that have one of its associated event radio points 106-E as their primary RP 106 by the number of UEs 112 that have one of its associated seating radio points 106-S as their primary RP 106. This second fraction is also referred to here as the "SV FRACTION$_i$," calculated at a point in time i.

The controller 104 is also configured to calculate long-term moving averages of the RACH FRACTION$_i$ and SV FRACTION$_i$ metrics. For example, moving averages of the RACH FRACTION$_i$ and SV FRACTION$_i$ metrics taken over several hours can be used. These moving averages are also referred to here as the "RACH FRACTION AVERAGE" and "SV FRACTION AVERAGE", respectively, calculated at a point in time i.

Method 300 comprises calculating, by the current controller 104 for the RPs 106 homed to it, the RACH FRACTION$_i$, SV FRACTION$_i$, RACH FRACTION AVERAGE$_i$ and SV FRACTION AVERAGE$_i$ metrics for the current time i (block 302). In this exemplary embodiment, these metrics are calculated periodically (for example, every time method 300 is performed, which in one example is performed once every 15 minutes).

After updated metrics are calculated, in the case that the event radio points 106-E homed to the current controller 104 are currently operated in the reduced transmit power state (checked in block 304), if either the current value of RACH FRACTION$_i$ is greater than an associated predetermined threshold (referred to here as the "RACH FRACTION THRESHOLD") or the current value of SV FRACTION$_i$ is greater than an associated predetermined threshold (referred to here as the "SV FRACTION THRESHOLD") (checked in block 306), the controller 104 causes the event radio points 106-E homed to the current controller 104 to be operated in the normal transmit power state (block 308).

In the case that the event radio points 106-E homed to the current controller 104 are currently operated in the normal transmit power state (checked in block 304), if either the RACH FRACTION AVERAGE$_i$ for the current time i is less than an associated predetermined threshold (referred to here as the "RACH FRACTION AVERAGE THRESHOLD") or the SV FRACTION AVERAGE$_i$ for the current time i is less than an associated predetermined threshold (referred to here as the "SV FRACTION AVERAGE THRESHOLD") (checked in block 310), the current controller 104 causes the event radio points 106-E homed to it to be operated in the reduced transmit power state (block 312).

In the exemplary embodiment shown in FIG. 3, the transmit power state of the event radio points 106-E is changed if one of multiple conditions are true—one that is a function of the number of detected PRACH transmissions and another that is a function of the number of UEs 112 that have a particular type of radio point 106 as their radio points 106. However, it is to be understood that these conditions can be used separately and/or in combination with other conditions. Also, the metrics used in the conditions for determining whether to transition the event radio points 106-E from the reduced transmit power state to the normal transmit power state can differ from the metrics used in the conditions for determining whether to transition the event radio points 106-E from the normal transmit power state to the reduced transmit power state.

The RACH FRACTION THRESHOLD and SV FRACTION THRESHOLD are selected to correspond to the lowest values of RACH FRACTION and SV FRACTION, respectively, that correspond to a significant number of spectators being in the event area 126 (for example, corresponding to when a concert is being hosted in the venue 102). These values can be determined experimentally. In one exemplary implementation, values of around 0.05 are used for both the RACH FRACTION THRESHOLD and SV FRACTION THRESHOLD.

Also, in one implementation, hysteresis is introduced between the RACH FRACTION and the RACH FRACTION AVERAGE THRESHOLD and between the SV FRACTION and the SV FRACTION AVERAGE THRESHOLD to avoid the event radio points 106-E ping-ponging between the normal and reduced transmit power states. For example, the RACH FRACTION AVERAGE THRESHOLD can be set a predetermined percentage below the RACH FRACTION THRESHOLD, and the SV FRACTION AVERAGE THRESHOLD can be set a predetermined percentage below the SV FRACTION.

In this exemplary embodiment, the current value of the RACH FRACTION, and the SV FRACTION, are used in determining when to transition the event radio points 106-E from being operated in the reduced transmit power state to being operated in the normal transmit power state whereas long-term moving averages of those metrics are used in determining when to transition the event radio points 106-E from being operated in the normal transmit power state to being operated in the reduced transmit power state. This is done so that the controller 104 quickly transitions the event radio points 106-E from being operated in the reduced transmit power state to being operated in the normal transmit power state while slowly transitioning the event radio points 106-E from being operated in the normal transmit power state to being operated in the reduced transmit power state. This is done because after a concert (or other event where the spectators are in the event area 126) is held in the venue 102 and the spectators have left the venue 102, a significant delay before transitioning the event radio points 106-E from being operated in the normal transmit power state to being operated in the reduced transmit power state would not detrimentally impact the service provided to spectators in the event area 126 since the spectators would have left the venue 102, whereas a significant delay between transitioning the event radio points 106-E from being operated in the reduced transmit power state to being operated in the normal transmit power state would detrimentally impact the service provided to spectators in the event area 126. Also, the use of the current value of the RACH FRACTION$_i$ and the SV FRACTION$_i$ in determining when to transition the event radio points 106-E from being operated in the reduced transmit power state to being operated in the normal transmit power state while using long-term moving averages of those metrics in determining when to transition the event radio points 106-E from being operated in the normal transmit power state to being operated in the reduced transmit power state also helps in avoiding the ping-ponging between those two states.

Although the automatic transmit power control technique described here in connection with method 300 is described in the context of a single controller 104, it is to be understood that the determination as to whether spectators are located in the event area 126 of the venue 102 can be made by a single "master" controller 104 for all of the controllers 104 in the cluster 124 or each controller 104 can make that determination independently. Also, the conditions associated with the plurality of radio points 106 used by any such controller 104 making that determination can be the conditions associated with only the radio points 106 homed to that particular controller 104 or can be the conditions associated with more than just the radio points 106 homed to that particular controller 104 (for example, the conditions associated with all of the radio points 106 in the C-RAN 100, regardless of which controllers 104 they are homed to).

The exemplary embodiment of method 300 described above in connection with FIG. 3 is only one example and it is to be understood that other embodiments can be implemented in other ways.

The methods and techniques described here may be implemented in digital electronic circuitry, or with a programmable processor (for example, a special-purpose processor or a general-purpose processor such as a computer) firmware, software, or in combinations of them. Apparatus embodying these techniques may include appropriate input and output devices, a programmable processor, and a storage medium tangibly embodying program instructions for execution by the programmable processor. A process embodying these techniques may be performed by a programmable processor executing a program of instructions to perform desired functions by operating on input data and generating appropriate output. The techniques may advantageously be implemented in one or more programs that are executable on a programmable system including at least one programmable processor coupled to receive data and instructions from, and to transmit data and instructions to, a data storage system, at least one input device, and at least one output device. Generally, a processor will receive instructions and data from a read-only memory and/or a random access memory. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and DVD disks. Any of the foregoing may be supplemented by, or incorporated in, specially-designed application-specific integrated circuits (ASICs).

A number of embodiments of the invention defined by the following claims have been described. Nevertheless, it will be understood that various modifications to the described embodiments may be made without departing from the spirit and scope of the claimed invention. Accordingly, other embodiments are within the scope of the following claims.

EXAMPLE EMBODIMENTS

Example 1 includes a system to provide wireless service to user equipment using an air interface in a venue having an event area, the system comprising: a controller communicatively coupled to a core network; and a plurality of radio points to transmit and receive radio frequency signals to and from the user equipment, each of the radio points associated with at least one antenna and located remote from the controller; wherein the controller configured to perform at least some Layer-3, Layer-2, and Layer-1 processing for the air interface; wherein a subset of the radio points is mounted in or near the venue so as to primarily provide wireless coverage to user equipment located in the event area; and wherein the controller is configured to automatically perform the following: if the subset of radio points is operated in a reduced transmit power state: determine if conditions associated with the plurality of radio points indicate that spectators are located in the event area of the venue; and cause the subset of radio points to be operated in a normal transmit power state in response to determining that the conditions associated with the plurality of radio points indicate that spectators are located in the event area of the venue; and if the subset of radio points is operated in the normal transmit power state: determine if the conditions associated with the plurality of radio points indicate that spectators are not located in the event area of the venue; and cause the subset of radio points to be operated in the reduced transmit power state in response to determining that the conditions associated with the plurality of radio points indicate that spectators are not located in the event area of the venue.

Example 2 includes the system of Example 1, wherein each of the radio points is configured to detect random access channel transmissions from user equipment; wherein the controller is configured to periodically calculate a number of random access channel transmissions from the user equipment that are detected by the subset of radio points over a time window; and wherein the controller is configured to determine if the conditions associated with the plurality of radio points indicate that spectators are or are not located in the event area of the venue based on the number of random access channel transmissions from the user equipment that are detected by the subset of radio points.

Example 3 includes the system of Example 2, wherein the controller is configured to periodically calculate a number of random access channel transmissions from the user equipment that are detected by the radio points that are not included in the subset of radio points over the time window; and wherein the controller is configured to determine if the conditions associated with the plurality of radio points indicate that spectators are or are not located in the event area of the venue based on the number of random access channel transmissions from the user equipment that are detected by the subset of radio points over the time window and based on the number of random access channel transmissions from the user equipment that are detected by the radio points that are not included in the subset of radio points over the time window.

Example 4 includes the system of Example 3, wherein the controller is configured to periodically calculate a fraction comprising the number of random access channel transmissions from the user equipment that are detected by the subset of radio points divided by the number of random access channel transmissions from the user equipment that are detected by the radio points that are not included in the subset of radio points; and wherein the controller is configured to periodically calculate a moving average of the fraction; and wherein the controller is configured to determine if the conditions associated with the plurality of radio points indicate that spectators are located in the event area of the venue by determining if the fraction is greater than a first threshold; and wherein the controller is configured to determine if the conditions associated with the plurality of radio points indicate that spectators are not located in the event area of the venue by determining if the moving average is less than a second threshold.

Example 5 includes the system of Example 4, wherein the second threshold is less than the first threshold in order to introduce hysteresis between causing the subset of radio points to be operated in the normal transmit power state and causing the subset of radio points to be operated in the reduced transmit power state.

Example 6 includes the system of any of the Examples 1-5, wherein the controller maintains a respective signature vector (SV) for each item of user equipment, wherein each SV comprises, for each radio point, a signal reception metric indicative of a power level received by that radio point from that item of user equipment; wherein the controller is configured to determine a primary radio point for each item of user equipment based on the signature vector maintained for that item of user equipment; wherein the controller is configured to periodically calculate a number of primary radio points that are included in the subset of radio points; and wherein the controller is configured to determine if the conditions associated with the plurality of radio points indicate that spectators are or are not located in the event area of the venue based on the number of primary radio points included in the subset of radio points.

Example 7 includes the system of Example 6, wherein the controller is configured to periodically calculate a number of primary radio points that are not included in the subset of radio points; and wherein the controller is configured to determine if the conditions associated with the plurality of radio points indicate that spectators are or are not located in the event area of the venue based on the number of primary radio points included in the subset of radio points and based on the number of primary radio points not included in the subset of radio points.

Example 8 includes the system of Example 7, wherein the controller is configured to periodically calculate a fraction comprising the number of primary radio points included in the subset of radio points divided by the number of primary radio points not included in the subset of radio points; and wherein the controller is configured to periodically calculate a moving average of the fraction; and wherein the controller is configured to determine if conditions associated with the plurality of radio points indicate that spectators are located in the event area of the venue by determining if the fraction is greater than a first threshold; and wherein the controller is configured to determine if the conditions associated with the plurality of radio points indicate that spectators are not located in the event area of the venue by determining if the moving average of the fraction is less than a second threshold.

Example 9 includes the system of Example 8, wherein the second threshold is less than the first threshold in order to introduce hysteresis between causing the subset of radio points to be operated in the normal transmit power state and causing the subset of radio points to be operated in the reduced transmit power state.

Example 10 includes the system of any of the Examples 1-9, wherein the system comprises a plurality of controllers; and wherein the conditions associated with the plurality of radio points comprise conditions associated with radio points that are homed to a plurality of controllers included in the system.

Example 11 includes the system of any of the Examples 1-10, wherein the venue comprises at least one of: a stadium, wherein the event area of the venue comprises a pitch in the stadium; and an area, wherein the event area comprises an event area in the arena.

Example 12 includes a method of performing automatic transmit power in a centralized radio access network (C-RAN) system comprising a controller communicatively coupled to a core network and a plurality of radio points to transmit and receive radio frequency signals to and from user equipment, each of the radio points associated with at least one antenna and located remote from the controller, wherein the controller is configured to perform at least some Layer-3, Layer-2, and Layer-1 processing for the air interface, and wherein a subset of the radio points is mounted in or near a venue so as to primarily provide wireless coverage to user equipment located in an event area of the venue, the method comprising: if the subset of radio points is operated in a reduced transmit power state: determining by the controller if conditions associated with the plurality of radio points indicate that spectators are located in the event area of the venue; and causing the subset of radio points to be operated in a normal transmit power state in response to determining that the conditions associated with the plurality of radio points indicate that spectators are located in the event area of the venue; and if the subset of radio points is operated in the normal transmit power state: determining by the controller if the conditions associated with the plurality of radio points indicate that spectators are not located in the event area of the venue; and causing the subset of radio points to be operated in the reduced transmit power state in response to determining that the conditions associated with the plurality of radio points indicate that spectators are not located in the event area of the venue.

Example 13 includes the method of Example 12, wherein each of the radio points is configured to detect random access channel transmissions from user equipment; wherein the method further comprises periodically calculating by the controller a number of random access channel transmissions from user equipment that are detected by the subset of radio points over the time window; and wherein at least one of determining if the conditions associated with the plurality of radio points indicate that spectators are located in the event area of the venue and determining if the conditions associated with the plurality of radio points indicate that spectators are located in the event area of the venue is based on the number of random access channel transmissions from user equipment that are detected by the subset of radio points.

Example 14 includes the method of Example 13, wherein the method further comprises periodically calculating a number of random access channel transmissions from user equipment that are detected by the radio points that are not included in the subset of radio points over the time window; and wherein determining if the conditions associated with the plurality of radio points indicate that spectators are or are not located in the event area of the venue is based on the number of random access channel transmissions from user equipment that are detected by the subset of radio points over the time window and based on the number of random access channel transmissions from user equipment that are detected by the radio points that are not included in the subset of radio points over the time window.

Example 15 includes the method of Example 14, wherein the method further comprises: periodically calculating a fraction comprising the number of random access channel transmissions from user equipment that are detected by the subset of radio points divided by the number of random access channel transmissions from user equipment that are detected by the radio points that are not included in the subset of radio points; and periodically calculating a moving average of the fraction; wherein determining if conditions associated with the plurality of radio points indicate that spectators are located in the event area of the venue comprises determining if the fraction is greater than a first threshold; and wherein determining if the conditions associated with the plurality of radio points indicate that spectators are not located in the event area of the venue comprises determining if the moving average is less than a second threshold.

Example 16 includes the method of Example 15, wherein the second threshold is less than the first threshold in order to introduce hysteresis between causing the subset of radio points to be operated in the normal transmit power state and causing the subset of radio points to be operated in the reduced transmit power state.

Example 17 includes the method of any of the Examples 12-16, wherein the controller maintains a respective signature vector (SV) for each item of user equipment, wherein each SV comprises, for each radio point, a signal reception metric indicative of a power level received by that radio point from that item of user equipment; wherein the controller is configured to determine a primary radio point for each item of user equipment based on the signature vector maintained for that item of user equipment; wherein the method further comprises periodically calculating a number of primary radio points that are included in the subset of radio points; and wherein determining if the conditions associated with the plurality of radio points indicate that spectators are or are not located in the event area of the venue is based on the number of primary radio points included in the subset of radio points.

Example 18 includes the method of Example 17, wherein the method further comprises periodically calculating a number of primary radio points that are not included in the subset of radio points; and wherein determining if the conditions associated with the plurality of radio points indicate that spectators are or are not located in the event area of the venue is based on the number of primary radio points included in the subset of radio points and on the number of primary radio points not included in the subset of radio points.

Example 19 includes the method of Example 18, wherein the method further comprises: periodically calculating a fraction comprising the number of primary radio points included in the subset of radio points divided by the number of primary radio points not included in the subset of radio points; and periodically calculating a moving average of the fraction; and wherein determining if conditions associated with the plurality of radio points indicate that spectators are located in the event area of the venue comprises determining if the fraction is greater than a first threshold; and wherein determining if the conditions associated with the plurality of radio points indicate that the spectators are not located in the event area of the venue comprises determining if the moving average of the fraction is less than a second threshold.

Example 20 includes the method of Example 19, wherein the second threshold is less than the first threshold in order to introduce hysteresis between causing the subset of radio points to be operated in the normal transmit power state and causing the subset of radio points to be operated in the reduced transmit power state.

Example 21 includes the method of any of the Examples 12-20, wherein the C-RAN system comprises a plurality of controllers; and wherein the conditions associated with the plurality of radio points comprise conditions associated with radio points that are homed to a plurality of controllers included in the system.

Example 22 includes the method of any of the Examples 12-21, wherein the venue comprises at least one of: a stadium, wherein the event area of the venue comprises a pitch in the stadium; and an area, wherein the event area comprises an event area in the arena.

What is claimed is:

1. A system to provide wireless service to user equipment using an air interface in a venue having an event area, the system comprising:
   a controller communicatively coupled to a core network; and
   a plurality of radio points to transmit and receive radio frequency signals to and from the user equipment, each of the radio points associated with at least one antenna and located remote from the controller;
   wherein the controller configured to perform at least some Layer-3, Layer-2, and Layer-1 processing for the air interface;
   wherein a subset of the radio points is mounted in or near the venue so as to primarily provide wireless coverage to user equipment located in the event area; and
   wherein the controller is configured to automatically perform the following:
      if the subset of radio points is operated in a reduced transmit power state:
         determine, using information derived from transmissions from the user equipment received by the radio points, if conditions associated with the plurality of radio points indicate that spectators are located in the event area of the venue; and
         cause the subset of radio points to be operated in a normal transmit power state in response to determining that the conditions associated with the plurality of radio points indicate that spectators are located in the event area of the venue; and
      if the subset of radio points is operated in the normal transmit power state:
         determine, using the information derived from the transmissions from the user equipment received by the radio points, if the conditions associated with the plurality of radio points indicate that spectators are not located in the event area of the venue; and
         cause the subset of radio points to be operated in the reduced transmit power state in response to determining that the conditions associated with the plurality of radio points indicate that spectators are not located in the event area of the venue.

2. The system of claim 1, wherein each of the radio points is configured to detect random access channel transmissions from user equipment;
   wherein the controller is configured to periodically calculate a number of random access channel transmissions from the user equipment that are detected by the subset of radio points over a time window; and
   wherein the controller is configured to determine if the conditions associated with the plurality of radio points indicate that spectators are or are not located in the event area of the venue based on the number of random access channel transmissions from the user equipment that are detected by the subset of radio points.

3. The system of claim 2, wherein the controller is configured to periodically calculate a number of random access channel transmissions from the user equipment that are detected by the radio points that are not included in the subset of radio points over the time window; and
   wherein the controller is configured to determine if the conditions associated with the plurality of radio points indicate that spectators are or are not located in the event area of the venue based on the number of random access channel transmissions from the user equipment that are detected by the subset of radio points over the time window and based on the number of random access channel transmissions from the user equipment that are detected by the radio points that are not included in the subset of radio points over the time window.

4. The system of claim 3, wherein the controller is configured to periodically calculate a fraction comprising the number of random access channel transmissions from the user equipment that are detected by the subset of radio points divided by the number of random access channel transmissions from the user equipment that are detected by the radio points that are not included in the subset of radio points; and
   wherein the controller is configured to periodically calculate a moving average of the fraction; and
   wherein the controller is configured to determine if the conditions associated with the plurality of radio points indicate that spectators are located in the event area of the venue by determining if the fraction is greater than a first threshold; and wherein the controller is configured to determine if the conditions associated with the plurality of radio points indicate that spectators are not located in the event area of the venue by determining if the moving average is less than a second threshold.

5. The system of claim 4, wherein the second threshold is less than the first threshold in order to introduce hysteresis between causing the subset of radio points to be operated in the normal transmit power state and causing the subset of radio points to be operated in the reduced transmit power state.

6. The system of claim 1, wherein the controller maintains a respective signature vector (SV) for each item of user equipment, wherein each SV comprises, for each radio point, a signal reception metric indicative of a power level received by that radio point from that item of user equipment;

wherein the controller is configured to determine a primary radio point for each item of user equipment based on the signature vector maintained for that item of user equipment;

wherein the controller is configured to periodically calculate a number of primary radio points that are included in the subset of radio points; and wherein the controller is configured to determine if the conditions associated with the plurality of radio points indicate that spectators are or are not located in the event area of the venue based on the number of primary radio points included in the subset of radio points.

7. The system of claim 6, wherein the controller is configured to periodically calculate a number of primary radio points that are not included in the subset of radio points; and wherein the controller is configured to determine if the conditions associated with the plurality of radio points indicate that spectators are or are not located in the event area of the venue based on the number of primary radio points included in the subset of radio points and based on the number of primary radio points not included in the subset of radio points.

8. The system of claim 7, wherein the controller is configured to periodically calculate a fraction comprising the number of primary radio points included in the subset of radio points divided by the number of primary radio points not included in the subset of radio points; and wherein the controller is configured to periodically calculate a moving average of the fraction; and wherein the controller is configured to determine if conditions associated with the plurality of radio points indicate that spectators are located in the event area of the venue by determining if the fraction is greater than a first threshold; and wherein the controller is configured to determine if the conditions associated with the plurality of radio points indicate that spectators are not located in the event area of the venue by determining if the moving average of the fraction is less than a second threshold.

9. The system of claim 8, wherein the second threshold is less than the first threshold in order to introduce hysteresis between causing the subset of radio points to be operated in the normal transmit power state and causing the subset of radio points to be operated in the reduced transmit power state.

10. The system of claim 1, wherein the system comprises a plurality of controllers; and wherein the conditions associated with the plurality of radio points comprise conditions associated with radio points that are homed to a plurality of controllers included in the system.

11. The system of claim 1, wherein the venue comprises at least one of:
a stadium, wherein the event area of the venue comprises a pitch in the stadium; and
an area, wherein the event area comprises an event area in the arena.

12. A method of performing automatic transmit power in a centralized radio access network (C-RAN) system comprising a controller communicatively coupled to a core network and a plurality of radio points to transmit and receive radio frequency signals to and from user equipment, each of the radio points associated with at least one antenna and located remote from the controller, wherein the controller is configured to perform at least some Layer-3, Layer-2, and Layer-1 processing for the air interface, and wherein a subset of the radio points is mounted in or near a venue so as to primarily provide wireless coverage to user equipment located in an event area of the venue, the method comprising:

if the subset of radio points is operated in a reduced transmit power state:
determining by the controller, using information derived from transmissions from the user equipment received by the radio points, if conditions associated with the plurality of radio points indicate that spectators are located in the event area of the venue; and
causing the subset of radio points to be operated in a normal transmit power state in response to determining that the conditions associated with the plurality of radio points indicate that spectators are located in the event area of the venue; and if the subset of radio points is operated in the normal transmit power state:
determining by the controller, using the information derived from the transmissions from the user equipment received by the radio points, if the conditions associated with the plurality of radio points indicate that spectators are not located in the event area of the venue; and
causing the subset of radio points to be operated in the reduced transmit power state in response to determining that the conditions associated with the plurality of radio points indicate that spectators are not located in the event area of the venue.

13. The method of claim 12, wherein each of the radio points is configured to detect random access channel transmissions from user equipment;

wherein the method further comprises periodically calculating by the controller a number of random access channel transmissions from user equipment that are detected by the subset of radio points over the time window; and wherein at least one of determining if the conditions associated with the plurality of radio points indicate that spectators are located in the event area of the venue and determining if the conditions associated with the plurality of radio points indicate that spectators are located in the event area of the venue is based on the number of random access channel transmissions from user equipment that are detected by the subset of radio points.

14. The method of claim 13, wherein the method further comprises periodically calculating a number of random access channel transmissions from user equipment that are detected by the radio points that are not included in the subset of radio points over the time window; and wherein determining if the conditions associated with the plurality of radio points indicate that spectators are or are not located in the event area of the venue is based on the number of random access channel transmissions from user equipment that are detected by the subset of radio points over the time window and based on the number of random access channel transmissions from user equipment that are detected by the radio points that are not included in the subset of radio points over the time window.

15. The method of claim 14, wherein the method further comprises:

periodically calculating a fraction comprising the number of random access channel transmissions from user equipment that are detected by the subset of radio points divided by the number of random access channel transmissions from user equipment that are detected by the radio points that are not included in the subset of radio points; and periodically calculating a moving average of the fraction;

wherein determining if conditions associated with the plurality of radio points indicate that spectators are located in the event area of the venue comprises determining if the fraction is greater than a first threshold; and wherein determining if the conditions associated with the plurality of radio points indicate that spectators are not located in the event area of the venue comprises determining if the moving average is less than a second threshold.

16. The method of claim 15, wherein the second threshold is less than the first threshold in order to introduce hysteresis between causing the subset of radio points to be operated in the normal transmit power state and causing the subset of radio points to be operated in the reduced transmit power state.

17. The method of claim 12, wherein the controller maintains a respective signature vector (SV) for each item of user equipment, wherein each SV comprises, for each radio point, a signal reception metric indicative of a power level received by that radio point from that item of user equipment;

wherein the controller is configured to determine a primary radio point for each item of user equipment based on the signature vector maintained for that item of user equipment;

wherein the method further comprises periodically calculating a number of primary radio points that are included in the subset of radio points; and wherein determining if the conditions associated with the plurality of radio points indicate that spectators are or are not located in the event area of the venue is based on the number of primary radio points included in the subset of radio points.

18. The method of claim 17, wherein the method further comprises periodically calculating a number of primary radio points that are not included in the subset of radio points; and wherein determining if the conditions associated with the plurality of radio points indicate that spectators are or are not located in the event area of the venue is based on the number of primary radio points included in the subset of radio points and on the number of primary radio points not included in the subset of radio points.

19. The method of claim 18, wherein the method further comprises:

periodically calculating a fraction comprising the number of primary radio points included in the subset of radio points divided by the number of primary radio points not included in the subset of radio points; and periodically calculating a moving average of the fraction; and wherein determining if conditions associated with the plurality of radio points indicate that spectators are located in the event area of the venue comprises determining if the fraction is greater than a first threshold; and wherein determining if the conditions associated with the plurality of radio points indicate that the spectators are not located in the event area of the venue comprises determining if the moving average of the fraction is less than a second threshold.

20. The method of claim 19, wherein the second threshold is less than the first threshold in order to introduce hysteresis between causing the subset of radio points to be operated in the normal transmit power state and causing the subset of radio points to be operated in the reduced transmit power state.

21. The method of claim 12, wherein the C-RAN system comprises a plurality of controllers; and wherein the conditions associated with the plurality of radio points comprise conditions associated with radio points that are homed to a plurality of controllers included in the system.

22. The method of claim 12, wherein the venue comprises at least one of:

a stadium, wherein the event area of the venue comprises a pitch in the stadium; and an area, wherein the event area comprises an event area in the arena.

* * * * *